United States Patent [19]

Boeckmann et al.

[11] Patent Number: 4,623,762
[45] Date of Patent: Nov. 18, 1986

[54] STATIC DISCHARGE SNUBBER CIRCUIT FOR SILICON CONTROLLED RECTIFIER (SCR) TYPE TELEPHONE HOLD DEVICES

[75] Inventors: Eduard F. B. Boeckmann, Huntsville; Miranda L. James, Hartselle, both of Ala.

[73] Assignee: GTE Communication Systems Corporation, Northlake, Ill.

[21] Appl. No.: 680,035

[22] Filed: Dec. 10, 1984

[51] Int. Cl.$^4$ .................................... H04M 1/00
[52] U.S. Cl. ................................... 379/393; 379/163; 379/412
[58] Field of Search ............... 179/81 R, 84 R, 99 H; 307/252 J, 252 N

[56] References Cited

U.S. PATENT DOCUMENTS 4,011,413  3/1977  Phillips ..................... 179/99 H Primary Examiner—James L. Dwyer
Attorney, Agent, or Firm—Robert J. Black

[57] ABSTRACT

A snubber circuit for use with hold circuits employed in telecommunication applications that employ an SCR as the principle control device. The included circuit prevents false hold turn on in response to static discharge. Voice band impedance and ringing signals are not adversely affected by the addition of the circuit to a standard SCR type hold circuit.

11 Claims, 1 Drawing Figure

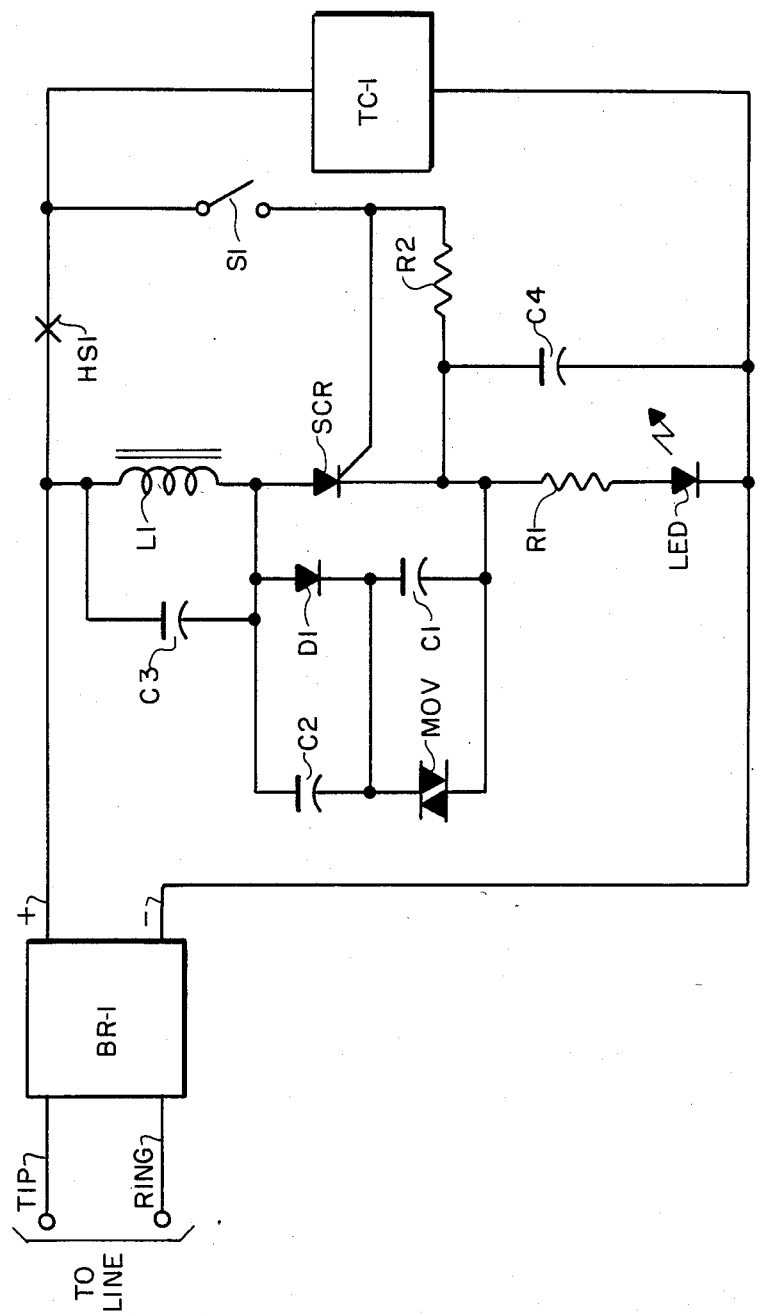

STATIC DISCHARGE SNUBBER CIRCUIT FOR SILICON CONTROLLED RECTIFIER (SCR) TYPE TELEPHONE HOLD DEVICES

CROSS REFERENCE TO RELATED APPLICATIONS

Patent applications by E. F. B. Boeckmann entitled "A Subscriber's Telephone Hold Circuit With Automatic Disconnect (Ser. No. 526,250 filed on Aug. 25, 1983) and "Hook Switch Bounce Resistant Telephone Hold-Mute Circuit (Ser. No. 560,623 filed on Dec. 21, 1983) both are related to the present application.

BACKGROUND OF THE INVENTION

1. Field of the Invention

The present application relates to telecommunication equipment employing SCR type hold circuits and more particularly a special SCR snubber circuit for preventing false hold "turn-on" in response to a static discharge.

2. Background Art

Since the development of telephone circuitry employing active components, i.e., solid state devices, etc., the addition of many features have been easy to add to the telephone. One such feature has been the addition of a so-called "hold" circuit. With the provision of such circuitry the telephone call may be electronically latched unto an artificial load allowing the hand set to return to the hook switch, until the call is picked up on an extension phone or again at the original telephone, at which time the hold condition is dropped automatically.

Previous hold circuits frequently made use of expensive components such as latching relays and/or integrated circuits comparators and related associated circuitry adding substantial cost to the telephone. In many instances such circuitry has poor sensitivity because of the compromise between trigger "on" sensitivity and the ability to drop completely on high resistance extensions and in the presence of low central office battery voltage. Some hold circuit methods require the use of a microprocessor and related circuitry to sense the line voltage change with conversion to a digital signal. It is obvious that all such circuitry suffers to some degree from overcomplexity with reduction in the intended reliability that stems from the increased number of components required in such circuit designs.

Many of the existing hold circuits also suffer from the lack of inclusion of an automatic delay or time-out facility. In this event, for example, if a call is placed on "hold" and an extension of the original phone is not again taken off hook within a predetermined time period, it is desirable that the "hold" condition should be dropped, to avoid excessive charge against the telephone subscriber. Another hazard which occurs and is particularly undesirable with the no time-out hold circuits is the effect of static discharge from a person to the telephone. Such static discharge can trigger the hold circuit into the "on-hold" state and will remain on until either the handset is picked up or a disconnect signal is received. In the event that the telephone is located on an ungrounded metal desk, a discharge to desk can also trigger the hold circuit to an "on" state.

Those hold circuits that are most susceptible to the static discharge effect are circuits that employ silicon controlled rectifier (SCR) devices. Such SCR circuits have the advantage of simplicity and high sensitivity for triggering on long telephone loops and usually employ what is termed a "sensitive gate" SCR. Such sensitive gate SCR's are also sensitive to a rapid rate of change of anode voltage that can trigger the SCR into the conductive mode or "on" state thereby turning on the hold circuit. A higher voltage rating for the SCR helps to overcome the problem but also makes it much more expensive. Without special protection or snubbing circuitry the anode of the SCR can be exposed to a rate of change of voltage and high absolute voltage far in excess of its ability of even the best SCR's to resist.

With a static discharge present, a very fast steep wave front pulse of up to 25,000 volts may be applied to the circuit. This can result in a very high voltage on the anode of the SCR and even very high frequency osciliation in the circuit which increases the probability of SCR turn on. In the case of the telephone on a metal desk, the desk can also become charged developing a corresponding charge in the ground plane of the telephone printed circuit board which draws its charge rapidly to the SCR to turn it on. Addition of shields to the telephone may help under some conditions but not under certain other conditions; therefore, a circuit to control the SCR under the discharge conditions is needed.

Some prior art snubber circuits have consisted of one or more transistors. The transistor circuits are costly and may not be effective with a sufficiently fast discharge. Transistors may also have to be of the same high voltage rating as the SCR, thus increasing the cost. Some have attempted to replace the SCR wih an NPN and PNP transistor combination but the problem with this is that the high voltage transistors (700 volt ratings) are hard to obtain and very costly, especially if of the PNP type. The high voltage ratings are necessary to withstand the lighting surge invironment particularly associated with telephone instruments.

Other snubber circuits have used combinations of resistors, diodes, capacitors and inductors to bridge the SCR's anode to cathode. All the circuits found in the literature suffer due to significant unbridged resistance in the snubber circuit. Computation shows that even as little as one ohm of unbridged resistance (such as that in a forward biased diode) is enough to dramatically raise the instantaneous voltage rate of change on a static discharge at the anode of the SCR. Another problem present in some of the prior art snubber circuits is the use of a capacitor with no protection for it due to over voltage and no discharge path for it so that once charged it will stay charged for a long period and not function well in the case of a second static pulse. Finally, in the case of the "hold" circuit no significant bridging loss can be tolerated when the "hold" circuit is not on. Such requirements as minimum voice band impedance on-hook, ring signalling impedance and off-hook impedance must be maintained. Also audio loss in the speech circuit because of the use of a snubber circuit must be less than 0.5 db. to be acceptable, or zero loss if possible.

SUMMARY OF THE INVENTION

The present invention consists of a circuit utilizing an inductor with an optional tuning capacity in parallel with it, a low forward resistance diode with a bridging capacitor, or a high capacitance high frequency tuning diode, a capacitor and a metallic oxide varistor (MOV).

The inductor which is of a low capacitance, high frequency type such as a ferrite toroid or RF choke, is placed in series with the anode circuit of the SCR. The inductor must have a relatively high self-resonant frequency, e.g. greater than 30 megahertz to be effective in the static discharge environment. It also should have an inductance of 8 microhenries or greater and shunt capacitance of less than 5 picofarads up to a frequency of 1000 megahertz. If the capacitance of the inductor is very low, as for example in the case of a toroid where it may have less than 2 picofarads of capacitance, it may be desirable to add a small amount of additional capacitance in parallel with the inductor to shape the voltage response at the anode of the SCR to the desired value as a function of time.

Bridging around the SCR, anode to cathode is a diode in series with a capacitor. This diode must have very low resistance in the forward direction in order to lower the dv/dt value on the SCR at the start of the discharge. In order to improve the response of the diode in transmitting the charge to the capacitor during the discharge, it is desirable to either (1) use a high capacitance tuning diode, or (2) use a small capacitor of say 200 picofarads to bridge the diode. The capacitor in series with the diode should be of a high voltage type preferably having a 200 or 300 volt rating. In order to protect the capacitor and provide a slow leakage discharge path for it, a 275 volt metallic oxide varistor is used in parallel with the capacitor. It should be noted that the diode then normally has no DC path to common because of the capacitor in series with it and the high voltage breakdown value of the metallic oxide varistor. Due to the fact that in normal telephone operations the diode is not conducting DC current it has a very high impedance to AC signals and therefore, prevents bridging loss to the telephone instrument. It should also be noted that if a large AC signal is applied such as a ring signal the circuit may conduct some AC current but due to the value of the capacitor used the impedance will be greater than 5000 ohms at frequencies less than 300 hertz (the only normal condition for large signal AC). Therefore, the snubber circuit is compatible with telecommunication applications.

In operation, a fast rise type pulse such as that from a static discharge, is applied first to the inductor. The inductor prevents instantaneous current flow which would otherwise cause a high voltage to appear at the anode of the SCR at the initial instant. As the current rises in the inductor, the charge is shunted around the SCR by the diode and the capacitor to the cathode or common side of the circuit, thereby maintaining a low value of voltage across the SCR during the pulse. If the circuit can maintain a dv/dt of less than say 40 volts per microsecond of time, an absolute voltage of less than the forward breakdown voltage of the SCR, it is not likely the SCR would turn on, thereby snubbing the circuit. The capacitor is protected from over voltage charge up during this surge by the metallic oxide varistor in parallel with it. The varistor also provides a small DC leakage path sufficient to allow the capacitor to discharge after several seconds.

A BRIEF DESCRIPTION OF THE DRAWING

The single sheet of the accompanying drawing is a simplified schematic diagram of a typical subscriber's telephone hold circuit incorporating a static discharge supression snubber circuit in accordance with the present invention. The associated telephone instrument circuitry has been shown only in block form as are other protective devices normally associated with lightning circuit protection inasmuch as they do not form a portion of the present invention.

DESCRIPTION OF THE PREFERRED EMBODIMENT

Referring now to the drawing, a typical SCR hold circuit is shown. The SCR, resistor R1 light emitting diode LED, resistor R2, capacitor C4, switch S1 and hook switch HS-1, are the components normally associated with the hold circuit in telephones and are shown only to provide a frame of reference for a typical application of the present invention. Those components comprising the functional part of the present invention consist of inductor L1, diode D1, capacitors C1, C2 and C3 and metallic oxide varistor MoV. Inductor L1 comprises the principle element to resist the instantaneous flow of charge into the SCR's anode circuit in the event of a static discharge pulse. Capacitor C3 in parallel with inductor L1 provides a way to shape the initial rate of increase of voltage or "tune" the circuit. It should be noted that the inductor L1 will also have some capacitance and this must be taken into account in assigning a value to capacitor C3. Diode D1 provides DC and small signal blocking under normal operation. In a practical embodiment this diode must have a low forward resistance and a relatively large capacitance of approximately 200 picofarads (similar to a tuning diode) or should be bridged with a capacitor of approximately 200 picofarads as shown with capacitor C2 in the drawing. Capacitor C1 provides the main shunting or charge storage element for the static discharge when diode D1 and capacitor C2 allow charge transfer. Since capacitor C1 is generally much larger in value than the original static discharge (usually a human body) when capacitor C1 accumulates the original static charge, the voltage across it will be much lower than the original static discharge voltage. Therefore, the voltage from anode to cathode of the SCR will also be controlled to the lower value.

The operation from the point of view of charge redistribution is as follows: The metallic oxide varistor MOV protects capacitor C1 from overcharging to the point where its dielectric would break down due to excess voltage. The metallic oxide varistor will allow a gradual discharge of capacitor C1 due to its known leakage versus voltage characteristic. The operation of the circuit can also be computed or simulated with standard circuit simulation programs, using conventional linear circuit analysis techniques. In final summary, important aspects of the invention are the use of a ferrite toroidal inductor or RF choke with tuning capacitor, the use of a high capacitance tuning diode or equivalently low forward resistance diode with a bridging capacitor in parallel with it, the use of a metallic oxide varistor (MOV) to protect the SCR bridging capacitor C1 and allow discharge of the capacitor and, finally, the use of a diode for DC blocking and AC imped-maintainance to meet telecommunication equipment requirements.

It will be obvious to those skilled in the art that numerous modifications may be made without departing from the spirit of the present invention which shall be limited only by the scope of the claims appended hereto.

What is claimed is:

1. A static discharge snubber circuit, a telephone connected to a telephone line, equipped with a hold circuit employing a silicon controlled rectifier (SCR), said snubber circuit including: an inductor of the ferrite toroid type, said inductor connected to series with said SCR, operated in response to the application of a static discharge pulse to said telephone or in the alternative to said telephone line, to resist the instantaneous flow of said pulse into said hold circuit.

2. A static discharge snubber circuit as claimed in claim 1 or 11, wherein:
said inductor is characterized as being of the low capacitance high frequency type.

3. A static discharge snubber circuit as claimed in claim 1 or 11, wherein:
said inductor has a self-resonant frequency greater than 30 MHz.

4. A static discharge snubber circuit as claimed in claim 3, wherein:
said inductor has a shunt capacitance of less than 5 picofarads up to a frequency of 1,000 MHz.

5. A static discharge snubber circuit as claimed in claim 1 or 11, wherein:
there is further included a capacitor in parallel with said inductor operated to shape the initial rate of increase of voltage within said snubber circuit.

6. A static discharge snubber circuit as claimed in claim 1 or 11, wherein:
said hold circuit includes a SCR and there is further included a network in series with said inductor and bridging said SCR;
said network including a diode operated to provide DC and small signal blocking under normal operations.

7. A static discharge snubber circuit as claimed in claim 5, wherein:
said diode has a low forward resistance and a relatively large capacitance in the order of 150 to 250 microfarads.

8. A static discharge snubber circuit as claimed in claim 6, wherein:
there is further included a capacitor included in said network and in series with said diode operated to function as a charge storage element for said static discharge pulse when said diode permits a charge transfer.

9. A static discharge snubber circuit as claimed in claim 5, wherein:
said diode is further bridged with a capacitor.

10. A static discharge snubber circuit as claimed in claim 5, wherein:
said network further includes a metallic oxide varistor in parallel with said capacitor, operated to protect said capacitor from overcharging due to excess voltage from said static discharge pulse.

11. A static discharge snubber circuit, a telephone connected to a telephone line, equipped with a hold circuit employing a silicon controlled rectifier (SCR) said snubber circuit including:
an RF choke, said choke connected to series with said SCR, operated in response to the application of a static discharge pulse to said telephone or in the alternative to said telephone line, to resist the instantaneous flow of said pulse into said hold circuit.

* * * * *